C. C. SMITH.
SPOKE REPAIR RING.
APPLICATION FILED AUG. 18, 1914.
1,166,015.
Patented Dec. 28, 1915.
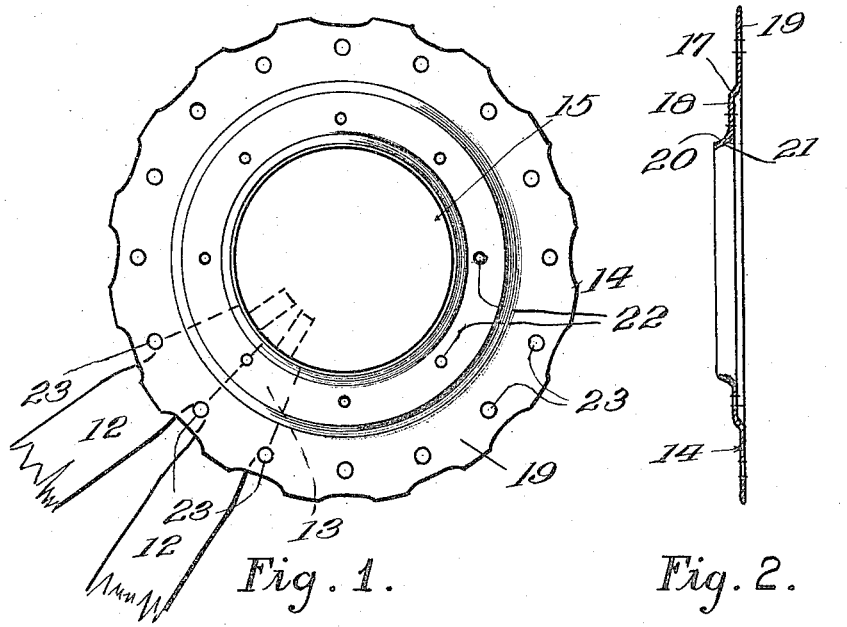
Fig. 1.
Fig. 2.
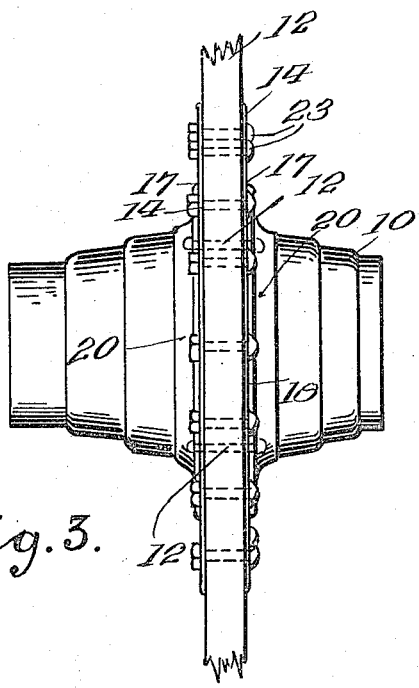
Fig. 3.
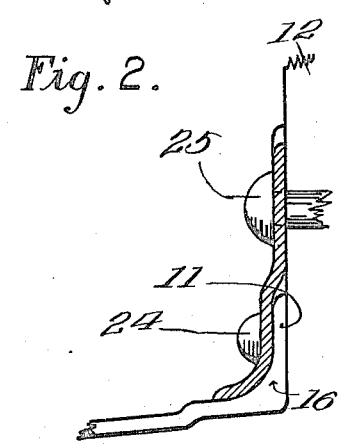
Fig. 4.
WITNESSES
INVENTOR
BY
ATTORNEYS

UNITED STATES PATENT OFFICE.

CHRISTOPHER C. SMITH, OF EUGENE, OREGON.

SPOKE-REPAIR RING.

1,166,015.  Specification of Letters Patent.  Patented Dec. 28, 1915.

Application filed August 18, 1914. Serial No. 857,383.

*To all whom it may concern:*

Be it known that I, CHRISTOPHER C. SMITH, citizen of the United States, residing at Eugene, in the county of Lane and State of Oregon, have invented certain new and useful Improvements in Spoke-Repair Rings, of which the following is a specification.

This invention relates to certain new and useful improvements in spoke rings or flanges adapted to be attached to the hub of a wheel to clamp the spokes upon each side thereof adjacent the hub, the invention being particularly designed for use in repair work wherein the spokes have become broken or weakened adjacent the hub.

The invention has as its primary object to provide an improved device of this character which may be readily attached to any conventional type of wheel hub wherein hub collars or flanges are employed to receive the inner extremities of the spokes and so constructed as to bear over the said flanges and to extend radially of the spokes to contact therewith upon opposite sides, connecting the inner extremities of any spokes which have been broken off, with the hub, and reinforcing the spokes radially.

A further object of the invention is to provide an improved spoke ring so constructed that the bolts or other fastening means connecting the rings arranged upon each side of the spokes will each engage between contiguous spokes to firmly hold the inner extremities of the spokes in position between the said rings, and the invention has as a still further object to provide an improved repair ring which will be simple in construction and efficient in operation.

With these and other objects in view, my invention will be more fully described, illustrated in the accompanying drawings and then specifically pointed out in the claims which are attached to and form a part of this application.

In the accompanying drawings:—Figure 1 is a front elevation showing my improved spoke ring attached and illustrating the manner in which the said ring is disposed to bear against the inner extremities of the spokes, as well as the arrangement of the apertures provided in the said ring for receiving bolts or other fastening means for connecting a pair of said rings when arranged upon each side of the spokes, Fig. 2 is a vertical sectional view of the ring and illustrating the manner in which the said ring is preferably formed so as to bear against the hub collars or flanges and to contact with the spokes upon the sides thereof, Fig. 3 is a fragmentary front elevation showing a pair of my improved rings applied to the wheel hub, the hub being conventionally illustrated, Fig. 4 is a fragmentary sectional view showing one of the rings applied.

Corresponding and like parts are referred to in the following description and indicated in all the views of the drawing by the same reference characters.

As previously indicated, my improved spoke ring or flange is particularly designed for use in repair work in connection with wheels wherein a hub is employed having annular collars or flanges formed thereon which are disposed to receive the inner extremities of the spokes of the wheel, although, it is to be understood that I do not wish to limit myself to this particular adaptation of the invention, since the said ring may be employed with equal efficiency upon wheels in their original construction. However, as is well known, in the conventional type of wheel wherein a metallic hub is employed, the said hub is provided with annular collars or flanges to receive the inner extremities of the spokes where wooden spokes are used, and for convenience, I have illustrated in Figs. 3 and 4 of the drawings, such a wheel hub, wherein the hub is indicated at 10 and the said collars or flanges between which the inner extremities of the spokes are interposed, at 11, the spokes being designated at 12, and having their inner extremities 13 squared and tapered to fit snugly between the said flanges 11.

Referring now more particularly to the subject of the present invention, I provide a preferably stepped annular hub ring or plate 14, which is preferably formed from a single piece of suitable sheet metal, although any other suitable material may be employed, and which is provided with a central opening 15 of a diameter to receive the wheel hub 10, it being intended that one of said rings 14 shall fit over each extremity of the hub 10 to bear against the flanges 11. It will be observed that the said flanges are provided with curved outer faces 16, as is usual.

Intermediate its edges, the body portion of the plate is pressed outwardly to provide an annular laterally extending shoulder 17 and to provide an offset radially extending portion 18, the portion 18 of the plate and the outer peripheral margin 19 thereof being in substantial parallel planes. At the inner margin of the portion 18, the body portion of the plate is again pressed outwardly to provide a laterally extending flange or collar 20, the said flange surrounding the opening 15.

It will be observed that the flange 20 is provided with a curved inner face 21 which merges at its inner extremity with the inner face of the offset portion 18, as best shown in Figs. 2 and 4 of the drawings. One of the plates 14 is positioned upon each extremity of the hub 10 to engage the hub flanges 16 and to contact with the spokes 12 adjacent their inner extremities and upon opposite sides thereof. Preferably, the plates 14 are of such diameter as to extend radially of the spokes well beyond the outer edges of the hub flanges 11 as best shown in Fig. 4 of the drawings, and it will be observed that the curved inner faces 21 as well as the inner faces of the offset portions 18 are disposed to conform to the contour of the outer faces of the hub flanges 11, the shoulders 17 extending over the outer edges of said flanges, while the margins 19 of the said plates are disposed to extend radially of the spokes upon opposite sides thereof and substantially parallel thereto, the said margins 19 seating against the sides of the spokes adjacent their inner extremities. The flanges 20 are of such diameter as to fit tightly around the hub 10 to engage the hub so that the plates cannot move radially thereon.

Formed in the plate 14 adjacent the inner edge thereof is a series of concentrically arranged circumferentially spaced openings 22 and formed in the said plate adjacent its outer edge, is a similar series of openings 23, the openings 23 being preferably larger than the openings 22. In the conventional type of wheel, wherein hub flanges 11 are employed, the said flanges are provided with a series of openings which are disposed to receive bolts which pass transversely between the inner extremities of the spokes to clamp said flanges against the sides of the spokes, and in applying my improved spoke rings these bolts are first removed so that the flanges 20 of the offset portions 18 thereof will seat against the outer curved faces of the said flanges 11. The inner series of openings 22 formed in said rings are then brought into alinement with the apertures formed in said flanges 11, and bolts 24 are then inserted through said apertures and through the flanges 11, to thus clamp the spoke rings against the flanges and to also bring the said flanges into engagement with the inner extremities of the spokes, the said bolts, as best shown in Fig. 4 of the drawings, passing through the offset portions 18 of the rings 14 to maintain said offset portions seated against the outer faces of the flanges 11.

As best shown in Fig. 1 of the drawings, the conventional type of spokes as employed in connection with wheels of the character herein set forth, are provided, at their inner extremities, with heads having flat side faces, the said heads of the spokes being disposed to contact with each other when arranged between the flanges 11. As best shown in Fig. 2 of the drawings, the series of openings 23 are formed in the margins 19 of the rings 14 and passing through the said openings 23 are bolts 25. As will be clear, by tightening the bolts 25, the margins 19 of said rings may be brought into severe engagement with the sides of the spokes and as best shown in Fig. 1 of the drawings, one of the bolts 25 is preferably arranged between each pair of spokes 12, the said bolts being so disposed radially of the rings 14 as to engage within the seats provided by the outer extremities of the laterally extending portions of the heads of the spokes. By this arrangement, radial movement of the spokes is prevented.

From the above description, it will be clear that the rings 14 may be made any desired diameter to extend radially of the spokes 12 in corresponding degree, and as shown in Fig. 4 of the drawings, the said rings will effectually brace the spokes at their inner extremities. This has been found in use, to be the weakest point of a wheel of the type herein set forth, the spokes often becoming broken off immediately adjacent the outer edges of the flanges 11. Consequently, in providing the rings to extend radially of the spokes beyond the said flanges, the said rings in case any of the spokes of the wheel have become broken off, will operatively connect the inner ends of the spokes so broken with the hub, while at the same time, the said rings will also brace and radially support the spokes of the wheel remaining intact.

Having thus described my invention, what I claim and desire to secure by Letters Patent is:—

1. The combination with a wheel including hub flanges disposed to receive the inner extremities of the spokes of the wheel and having curved outer faces, of clamping members for the spokes, one member being disposed to fit over each extremity of the hub to seat against the curved outer face of the adjacent flange, said member being provided with radially extending portions connected by an annular shoulder, one of said portions being arranged to confront the outer face of the adjacent flange with said shoulder extending over the peripheral edge thereof and the other of said radially extending portions being arranged to abut the inner extremities of the spokes upon the adjacent sides thereof, and means extending through said clamping members and through said flanges for maintaining the said clamping members in position upon the hub, the said means being disposed between contiguous spokes.

2. The combination with a wheel including a hub having hub flanges formed thereon bearing upon opposite sides of the inner ends of the spokes of the wheel and provided with curved outer faces, the said spokes being formed with laterally extending heads providing seats between contiguous spokes at the inner extremities thereof, of spoke rings fitting over the extremities of the hub and provided with laterally extending curved flanges engaging the curved outer faces of the hub flanges, said rings being formed with offset portions connected by annular curved shoulders, the offset portions of the rings respectively seating against the hub flanges and extending radially of the spokes with the said annular shoulders extending inwardly over the peripheries of the said flanges, fastening means connecting the rings adjacent the said flanges thereof and extending through the flanges of the hub between contiguous spokes, and fastening means connecting the rings adjacent their peripheries, the said last mentioned fastening means being each arranged to engage within one of said seats.

3. A spoke ring including a stepped annular plate providing offset portions joined by an annular shoulder, the said plate having a central opening formed therein disposed to receive one extremity of the hub of a wheel having hub flanges formed thereon disposed to receive the inner extremities of the spokes of the wheel, said opening being surrounded by a laterally extending collar disposed to engage the hub, one of said offset portions being arranged to abut the adjacent flange of the hub to extend radially thereof with said annular shoulder projecting inwardly over the peripheral edge of said flange and the other of said offset portions being arranged to abut the spokes upon the adjacent sides thereof, said plate having a series of circumferentially spaced apertures formed therein extending through one of said offset portions adjacent said collar and being provided with a second series of circumferentially spaced apertures extending through the other offset portion thereof, one plate being adapted to fit over each extremity of the hub and the said openings being adapted to receive bolts for connecting the plates.

4. A spoke ring including a stepped annular plate provided centrally with an opening surrounded by an annular flange extending laterally from the plate, the stepped portions of the plate being joined by an annular transversely curved shoulder, the said plate being adapted to fit over one end of a wheel hub provided with a hub flange with the hub extending through said opening and engaged by the flange of the plate, and with the stepped portion of the plate extending radially of the spokes of the wheel to be connected thereto with the said transversely curved shoulder bearing over the periphery of said hub flange.

In testimony whereof I affix my signature in presence of two witnesses.

CHRISTOPHER C. SMITH. [L. S.]

Witnesses:
 JESSE G. WELLS,
 AARON C. GUTHRIE.

Copies of this patent may be obtained for five cents each, by addressing the "Commissioner of Patents, Washington, D. C."